L. V. ARONSON.
HEATING DEVICE.
APPLICATION FILED FEB. 11, 1920.
1,358,495.
Patented Nov. 9, 1920.
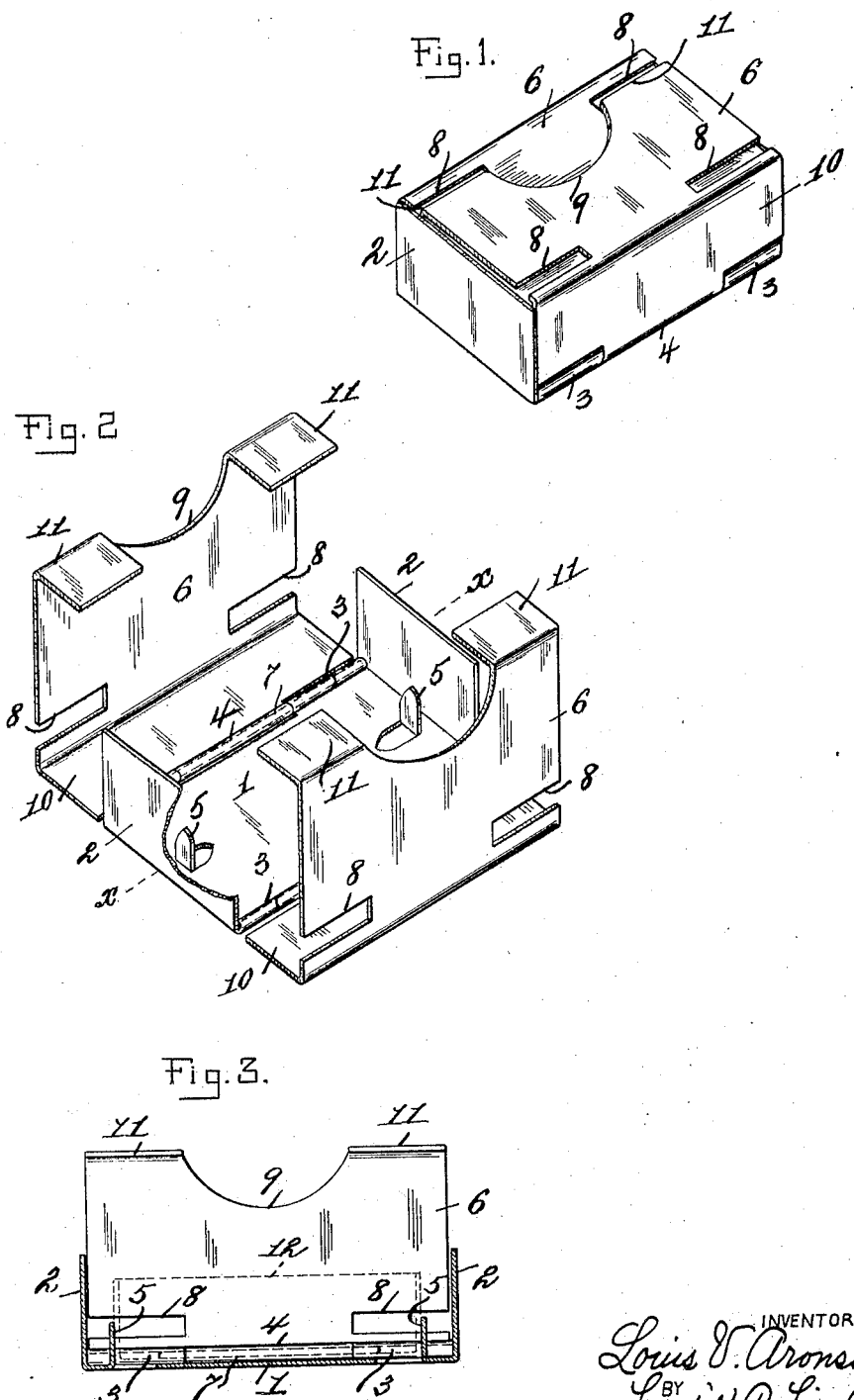

UNITED STATES PATENT OFFICE.

LOUIS V. ARONSON, OF NEWARK, NEW JERSEY.

HEATING DEVICE.

1,358,495.  Specification of Letters Patent.  Patented Nov. 9, 1920.

Application filed February 11, 1920. Serial No. 357,969.

*To all whom it may concern:*

Be it known that I, LOUIS V. ARONSON, a citizen of the United States, residing in the city of Newark, county of Essex, and State of New Jersey, have invented certain new and useful Improvements in Heating Devices, of which the following is a full, clear, and exact description, such as will enable others skilled in the art to which it pertains to make, construct, and use the same, reference being had to the accompanying drawings, and to numerals of reference marked thereon, forming a part of this specification.

This invention relates to heating devices primarily designed for pocket use, having for its object, the provision of a device adapted when folded or closed to contain a small receptacle filled with a solidified inflammable material, and when unfolded or open and in an extended position the hinged sides of the device, provide means for supporting a container, the contents of which may be heated by igniting the solidified material contained in the receptacle which is removably secured to the base of the device, by means of a pair of integral tongues struck up from the base thereby providing means for substituting a filled receptacle after removing the empty one.

With these ends in view, my invention consists in certain novelties of construction and arrangements of parts as hereinafter set forth and pointed out in the claims.

While the preferred form of my invention is illustrated in the accompanying drawing, yet it is to be understood that minor changes may be made without departing from the scope thereof.

In the drawings,

Figure 1 represents, a perspective view of the device illustrating the same closed.

Fig. 2 represents a similar view showing the device in its opened position, and

Fig. 3 represents a longitudinal central section taken on line $x$—$x$ of Fig. 2.

Similar numerals of reference refer to like parts throughout the specification and drawings.

The improved heating device is preferably made of sheet metal of any suitable kind, such as iron, aluminum or the like.

The base of the device comprises a body portion 1 provided with two upwardly extending ends 2—2 which form the closed ends of the device when it is folded as illustrated in Fig. 1 of the drawings.

Each longitudinal edge of the body portion 1, adjacent to the ends 2—2 is provided with the integral tubular bearings 3—3, which register with a similar integral tubular bearing 4 formed on each of the lids to be presently described.

The body portion 1 is provided with integral holding means 5—5 formed in the blank from which the base is made. These holding means 5—5 consist of integrally formed lugs extending inwardly from the body portion 1, thus providing a space between which, any suitable form of a small receptacle filled with a solidified inflammable material may be secured.

Each hinged lid 6 is pivotally secured to the body portion 1 of the base by means of a pintle 7, which is secured in the tubular bearing 4, the ends of which are located in the tubular bearings 3—3 of the body portion 1.

The parts are of such shape as to lend themselves readily to manufacture, by the use of suitable punches and dies from ordinary sheet metal.

Each hinged lid 6 is provided with two diametrically oppositely arranged slots 8—8 and a cut-away portion 9.

Extending from one side of each lid and at right angles thereto, is the integral side 10 by means of which said lid is hingedly secured to the base of the device by the bearing 4.

Extending from the other side of the lid and at right angles thereto, are the two integral projections 11—11 which form the supporting means and which are designed to engage and interlock with the slots 8—8 of the opposite lid.

When the parts are in the position illustrated in Fig. 2 of the drawings the two projections 11 on each lid 6 form means for supporting a container, the contents of which may be heated by igniting the solidified material contained in the receptacle 12 (shown in dotted lines in Fig. 3) and which is removably secured to the base of the device by means of the struck up tongues as clearly indicated in said figure.

Experience has demonstrated that the organization above described is a highly efficient one, and while I have shown the preferred embodiment of my present invention, I do not wish to be limited to the exact details of construction shown and described, as obvious modifications thereof, not involving the exercise of invention, may be made by any skilled mechanic, and such departures from what is herein set forth, I consider within the scope and terms of my claims.

Having thus described my invention, what I claim as new and desire to secure by Letters Patent is:

1. A device of the character described, comprising a base having integral ends projecting therefrom, lids pivotally secured to the longitudinal edges of the base, said base being provided with means for securing a receptacle thereon.

2. A device of the character described, comprising a base provided with means for securing a receptacle thereon, lids pivotally secured to the longitudinal edges of the base, said lids being provided with interlocking means adapted to engage with each other, whereby said lids are held in closed position.

3. A device of the character described, comprising a base having integral ends projecting therefrom, said base being further provided with means for securing a receptacle thereon, lids having integral sides formed thereon, pivotally secured to the longitudinal edges of the base.

4. A device of the character described, comprising a base having integral ends projecting therefrom, said base being further provided with means for securing a receptacle thereon, lids having integral sides formed thereon, pivotally secured to the longitudinal edges of the base, said lids being provided with interlocking means adapted to engage with each other, whereby said lids are held in closed position.

This specification signed and witnessed this ninth day of February, 1920.

LOUIS V. ARONSON.

Witnesses:
FRED'K C. FISCHER,
FERDINAND T. NOLL.